United States Patent Office.

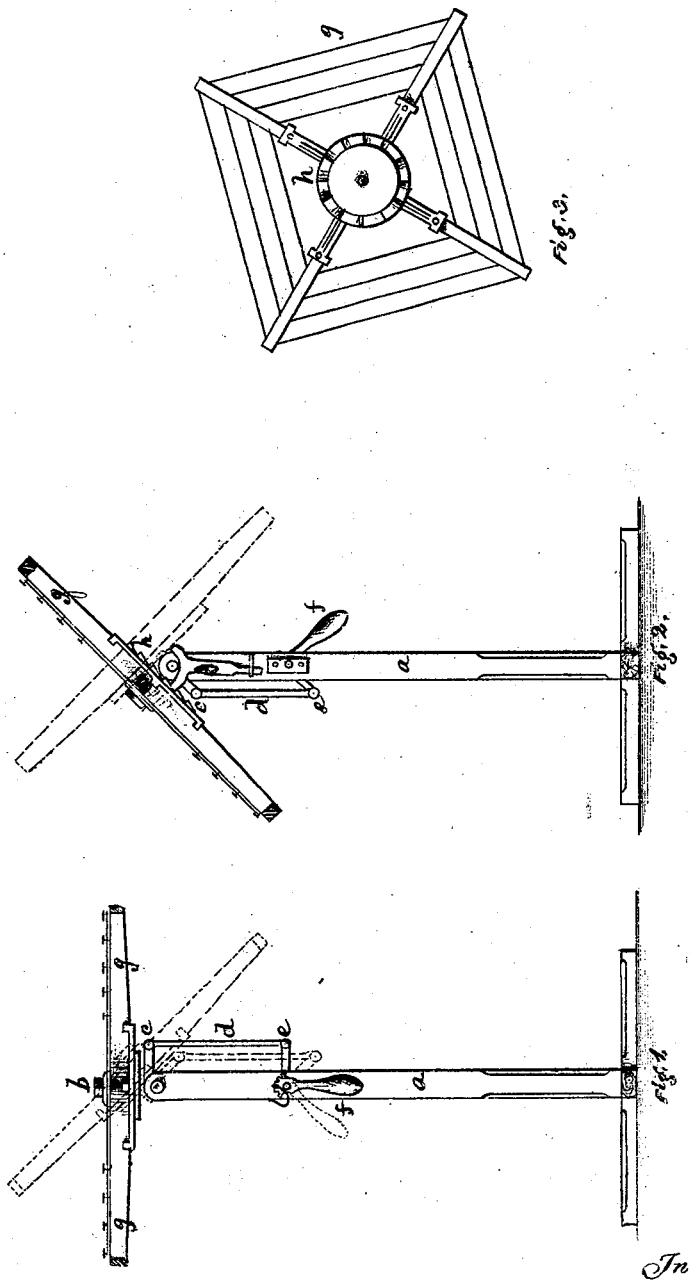

JOHN EMMERT, OF DUNLEITH, ILLINOIS.

Letters Patent No. 108,575, dated October 25, 1870.

IMPROVEMENT IN CLOTHES-DRIERS.

The Schedule referred to in these Letters Patent and making part of the same.

*To all whom it may concern:*

Be it known that I, JOHN EMMERT, of Dunleith, in the county of Jo Daviess and State of Illinois, have invented a new and useful Improved Double-acting Revolving Clothes-Reel; and I do hereby declare the following to be a full, clear, and exact description thereof, which will enable others skilled in the art to which my invention appertains to make and use the same, reference being had to the accompanying drawing forming part of this specification.

My invention relates to an improvement in devices for drying clothes.

The invention consists in applying certain new devices to a revolving clothes-reel, of which the following is a description.

Figure 1 is a perspective view of the device, showing the revolving reel in a level position; also, the dotted lines in an inclined position, both right and left, together with the relative changes of the machinery operating it.

Figure 2 is a reverse side of the device, showing other portions of the machinery.

Figure 3 is a vertical view of the reel upon the under side.

To enable others skilled in the art to make and use my invention, I will proceed to describe its construction and operation.

$a$, in fig. 1, is the standard, in the top of which is pivoted a vertical axle, $b$, with a horizontal arm, $c$, to the outer end of which is hinged connecting-rod $d$, which also connects a hinge with arm $e$, which is pivoted, at the other end, to handle $f$ and the main standard, which, by being vibrated right and left, tips the axle-arm $C$ from a vertical to any diagonal position required.

On said axle is the revolving reel $g$, which can be made to assume any desired position, as shown in figs. 1 and 2 in the dotted lines, and can be fixed in any position desired by means of the articulated circular segment and pin device upon the top end of handle $f$, the object being to elevate the reel high out of the way when level, and still capable of being tipped down within reach, to put on or take off the articles to be dried, the arm and handle device being for the purpose of bringing it down within the reach of the operator.

In fig. 2, upon the under side of axle-plate, fitted upon the reel, are ratchet-notches $h$.

Upon the standard below is a double pawl, I, so adapted that the reel can revolve freely when level, but when tipped either way, as shown by dotted lines, the pawl assumes also the proper position, and one horn or the other of it plays into the ratchet device $h$, and prevents the reel from turning except one way, so that it can be loaded with garments, and revolved around and upward until filled, when it is returned to a level position again.

What I claim as my invention, and desire to secure by Letters Patent, is—

1. In combination with the standard $a$ and revolving reel $g$, the angular arm $b$ $c$, connecting-rod $d$, pivoted arm $e$, and the handle $f$, with its locking-pin, substantially as described, for the purpose specified.

2. The double-acting pawl device $h$, in combination with ratchet-teeth on axle-plate $h$, for the purposes specified.

JOHN EMMERT.

Witnesses:
G. H. FROST,
D. I. POWERS.